(12) United States Patent
Rowe et al.

(10) Patent No.: US 7,698,897 B2
(45) Date of Patent: Apr. 20, 2010

(54) ENGINE CONTROL

(75) Inventors: Arthur L Rowe, Derby (GB); Anthony J Brook, Derby (GB)

(73) Assignee: Rolls-Royce plc, London (GB)

( * ) Notice: Subject to any disclaimer, the term of this patent is extended or adjusted under 35 U.S.C. 154(b) by 822 days.

(21) Appl. No.: 11/491,900

(22) Filed: Jul. 25, 2006

(65) Prior Publication Data
US 2007/0033944 A1    Feb. 15, 2007

(30) Foreign Application Priority Data
Aug. 9, 2005    (GB) ................. 0516324.1

(51) Int. Cl.
*F02C 9/28*    (2006.01)
(52) U.S. Cl. ..................... 60/773; 60/39.281
(58) Field of Classification Search .............. 60/39.281, 60/243, 773
See application file for complete search history.

(56) References Cited

U.S. PATENT DOCUMENTS

| | | | |
|---|---|---|---|
| 3,295,316 A * | 1/1967 | Beatrice et al. | .......... 60/39.281 |
| 4,321,791 A | 3/1982 | Carroll | |
| 5,345,386 A * | 9/1994 | Mullen et al. | ............... 701/100 |
| 6,202,399 B1 | 3/2001 | Frutschi | |
| 2005/0072159 A1 * | 4/2005 | Pashley et al. | ................. 60/773 |

FOREIGN PATENT DOCUMENTS

GB          811 563 SP        4/1959
WO    WO 02/088531 PU    11/2002

* cited by examiner

*Primary Examiner*—Louis J Casaregola
(74) *Attorney, Agent, or Firm*—Jeffrey S. Melcher; Manelli Denison & Selter PLLC

(57) ABSTRACT

It is known that overshoot in fuel flow rate as a result of compensating for engine heat soak effects can create transient over values in desired thrust parameters. These over values may be displayed and/or utilised in other engine control systems, and although transient may create problems within the engine and apprehension with a user. By adjusting the normally calculated fuel flow rate to a fuel regulator by the introduction of a fuel flow adjustment dependent upon a variable which is related to heat soak effects it is possible to reduce the extent of overshoot as well as the transient time period of that overshoot to ongoing operational state. The variable used may be direct or indirect and will generally utilise a temperature sensor within the engine and/or other engine control procedures which may be extrapolated from such sensor values to provide a variable for heat soak compensation.

9 Claims, 3 Drawing Sheets

ENGINE CONTROL

FIELD OF THE INVENTION

The present invention relates to engine control and more particularly to engine control in respect of fuel flow.

BACKGROUND OF THE INVENTION

It will be understood that efficient operation of engines such as gas turbine engines used for aircraft propulsion is important in terms of economy of operation as well as with respect to engine durability. In such circumstances, it is increasingly common to utilise relatively accurate sensing mechanisms in terms of monitoring engine performance for display to a user, as well as for utilisation within automatic control loops. Unfortunately, inherent thermal as well as mechanical variations between start up or other transients to steady state operation can be difficult to accommodate within these control regimes or may appear temporarily alarming to a user.

Of particular concern with respect to the present engine control is a situation with regard to fuel flow into a turbine engine during initial engine start up and rapid acceleration. It will be understood that an engine is generally cold at start up and therefore a proportion of the fuel flow, rather than being directed towards thrust or other prime movement is utilised in order to heat the engine components. This is known as "heat soak" within the engine and is generally accommodated by initial provision of additional fuel or a choke mechanism. This additional fuel, as indicated, acts to compensate for the heat soak effect of warming the engine components, but as the engine warms up it will be understood that there may be too much fuel flow and therefore effectively the engine is generating more than 100% of its rated performance. Thus, additional fuel is being used when not required and secondly through more accurate displays an alarming indication of such factors as turbine rotational speed as 2 or 3% above that acceptable may be displayed to users for a few seconds. This at least may cause anxiety and possibly lead to interactive compensation by the user.

SUMMARY OF THE INVENTION

In accordance with the present invention, there is provided an engine control method for a gas turbine engine, the method comprising providing a fuel flow to an engine, monitoring an engine temperature dependent variable and adjusting that fuel flow dependent upon the engine temperature variable to regulate the proportion of fuel flow necessary for thermal inertia within the engine.

Typically, the method comprises monitoring engine temperature directly through determination of engine component temperature and/or indirectly through gas flows through the engine.

Also in accordance with the present invention is provided an engine control arrangement for a gas turbine engine, the arrangement comprising a fuel regulator, a controller for the fuel regulator and a sensor for determining engine temperature, the controller adjusting the fuel regulator to provide an adjusted rate of fuel flow dependent upon engine temperature and the controller determining engine temperature by signals received from the sensor.

Typically, the sensor provides an indication of engine temperature directly through monitoring the engine components. Alternatively, the sensor provides an indication of engine temperature indirectly by extrapolation from gas flows through and within the engine. Normally such gas flows are in relation to gas entry temperatures to a combustion chamber for the engine.

BRIEF DESCRIPTION OF THE DRAWINGS

Embodiments of the present invention will now be described by way of example and with reference to the accompanying drawings in which.

DETAILED DESCRIPTION OF THE INVENTION

In order to achieve better engine efficiency and surety of performance it is desirable to reduce the size and duration of overshoots in power or thrust that arise in consequence of the interaction of heat soakage effects in the engine with typical control strategies which make no allowance for the extra fuel flow needed during acceleration from low power so increasing the temperature of the engine components. There are already a number of known and implemented strategies with regard to engine control. These strategies utilise a number of variables either determined directly by sensors or indirectly through a sensor monitoring another parameter and extrapolating to the desired probable temperature variable value. In such circumstances an indication of variation in a heat soakage effect, that is to say the proportion of fuel flow necessary to increase engine thermal conversion can be determined from the sensors or by extrapolation from sensor value determinations.

Figure 1:
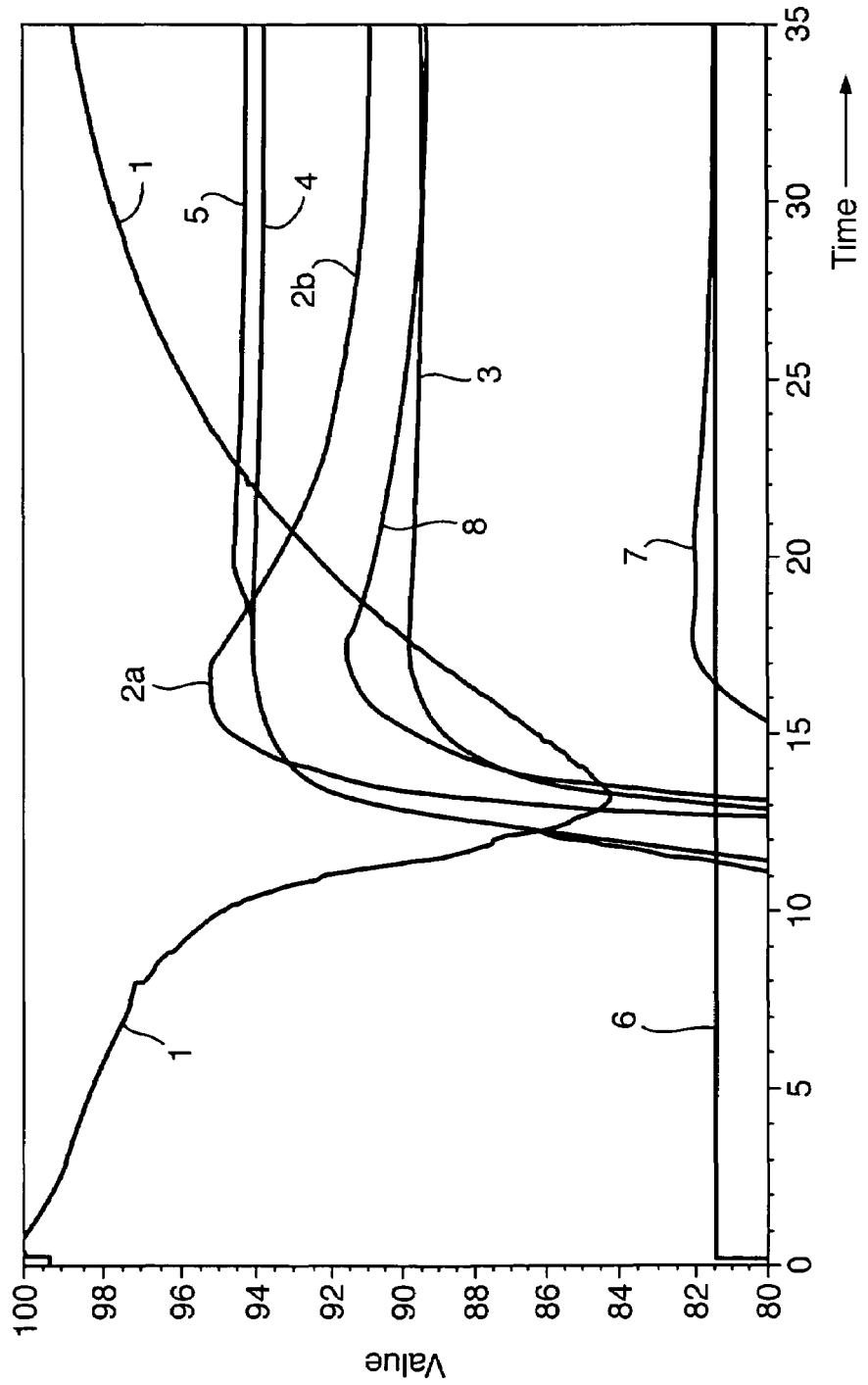
FIG. 1 is a graphic illustration of variations in fuel flow against various engine parameters and temperature.

FIG. 1 provides a graphic illustration of the typical variation that occurs between fuel flow and other factors such as turbine speeds and temperature. As can be seen in the time period from throttle movement it will be noted that fuel flow 2 rapidly increases until it reaches a peak to 2(a) and then declines to a steady state at 2(b). This peak is as a result of the fuel necessary for heat soak effect. As can be seen, the heat soak effect in terms of heating of the engine may be considered as demand 6, but in reality is actually that shown by curve 7. In such circumstances, the peak to 2(a) precedes the peak in actual heat soak requirements and in such circumstances there is slightly more fuel supplied than necessary for steady state operation. This is shown in the slightly higher rotational speed curves 3, 4, 5 against a flat line or steady rotational speed for the high pressure turbines in an engine. In such circumstances, it can be seen that these curves 3, 4, 5 slightly dip to a steady state from an overspeed just after the peak to 2a in fuel flow. It is this slight overspeed in the rotation of shaft speeds 3, 4, 5 which may demonstrate itself by percentage throttle values given on a display which are 1 or 2% greater than expected to a user and so cause concern.

Curve 1 provides an indication of an existing calculation made by an engine control arrangement in terms of expected temperature variation in the gas presented to a combustion chamber of an engine. As can be seen this curve 1 in a relevant time period mirrors the peak to 2a in the fuel flow causing overshoot problems, as described above.

The present engine control arrangement attempts to reduce the size and duration of fuel flow overshoots in terms of power and thrust as a consequence of the interaction of heat soak effects in the engine with known engine control strategies which made no allowance for the extra fuel flow needed following acceleration from low power, that is to say when the engine components themselves will require some energy to shift their thermal inertia. In order to achieve this engine control regime, direct or indirect temperature dependent variables which are known or possibly determinable within an engine are utilised. Thus, it is possible to adjust the fuel flow rate by a relationship to a heat soakage related parameter within the engine.

The engine control method and arrangement relates generally to the control of gas turbine engines following acceleration from low power to high power, and specifically to gas turbine aero engines following acceleration from idle to take-off power. Following acceleration to high power, the required fuel flow is typically up to 10% higher than the steady state value needed due to heat soakage effects in the engine. This excess fuel flow requirement decays with a time constant related to heating up of the engine hardware and typically is in the range 5-10 seconds.

Current gas turbine engine control systems—utilise proportional/integral/derivative (PID) control on a number of parameters in parallel, through the use of high and low wins selection gates. Here the action of only one of these control loops will be considered, as the invention relates to control of the engine when running at nearly constant power or thrust.

It is known to adjust the fuel supply to the engine with the intent of maintaining a fixed value of some power or thrust indicating parameter, which may be Engine Pressure Ratio (EPR) or low pressure shaft speed. Typically, the rate of change of fuel flow is proportional to the difference between the desired and actual values of the power or thrust indicating parameter. Normally some dynamic compensation is applied to this error term in order to better match the dynamic response of the engine and control system, and ensure the steady state error is reduced to zero. These dynamic terms usually have time constants about an order of magnitude smaller than that of the engine thermal response, and so have little interaction with it.

Essentially, prior art engine control systems and methods utilise a fixed relationship either presented as an algorithm or through a look up table between throttle demand and fuel flow. Such an approach, as indicated above, does not take account of heat soak effects through thermal inertia within the engine and consequently is subject to significant error. These errors create disparity between desired demand 6 (FIG. 1) and actual demand 7 (FIG. 1) which may manifest itself in displayed values to an operator of the engine such as a pilot or utilised within a closed loop control system where they may create unnecessary adjustments. As indicated above, what is desired is to reduce the size and duration of overshoots which arise as a consequence of the interaction of heat soak effects on the engine.

As indicated, there are no completely reliable variables for engine control in relation to fuel flow over the whole range to normal operation, so clearly reducing or eliminating the power or thrust overshoot occurring as a result of engine heat soakage would be beneficial but only if there is no long term consequences for normal engine control. To do this requires an additional step in the calculation of required rate of change of fuel flow, to allow for the effects of heat soakage, so that the control system can demand a reducing fuel flow required to match the engine demand, whilst maintaining a zero error in the control parameter itself.

Within an engine there will be a number of control signals and temperature dependent variables either directly or indirectly obtained. Direct variable values will be received from temperature sensors physically associated with the engine in terms of providing signals which indicate the temperature of a component at any particularly point. These temperature sensors will generally be thermocouples. It will be understood that actual direct engine component temperature values will indicate the heat soakage effects in terms of accommodating the thermal inertia of the engine as a result of throttle demands. Alternatively, indirect values will be calculated from typically temperature sensors associated with more indirect factors such as the gas temperature at the compressor parts of a gas turbine engine. These temperature dependent variables are determined to provide an estimate of the cooling or heating effects of heat soakage on the gas temperature at the compressor for controlling engine performance. It is by using these direct and/or indirect variable as temperature factors within the engine that through an appropriate relationship between that temperature value, throttle demand and fuel flow mean that a determination can be made as to the proportion of fuel flow attributable to the heat soaking effects upon the engine.

A direct approach to adjusting fuel flow involves utilising the rate of change of turbine gas temperature as a measurement of turbine heat soakage. Applying this control schedule to a simulated slam acceleration manoeuvre gives the improvement in overshoot behaviour shown in FIG. 3. The peak overshoot is halved and the duration of the overshoot reduced from about 10 seconds down to 3 seconds. Further improvements in overshoot may be obtained, but at the expense of some lengthening of the acceleration time, so a balance must be struck between these competing objectives with the responsivity of greater acceleration range generally winning.

The present engine control method and arrangement can be summarised by the relationship Actual fuel flow (AFF)=Normal fuel flow requirement (NFF) plus/minus a heat soak adjustment (HSA).

As indicated above, the normal fuel flow value will be determined by an existing control regime with proportional/integral/derivative (PID) control with high and low wins selection gates for desired operation. The present invention provides further adjustment (HSA) in this control regime through utilising a direct or indirect temperature dependent variable within the engine dependent upon heat soak performance for the engine. Thus, as indicated above, this adjustment (HSA) may be taken from direct component temperatures or indirectly through extrapolation calculations used for other engine control procedures.

Figure 2:
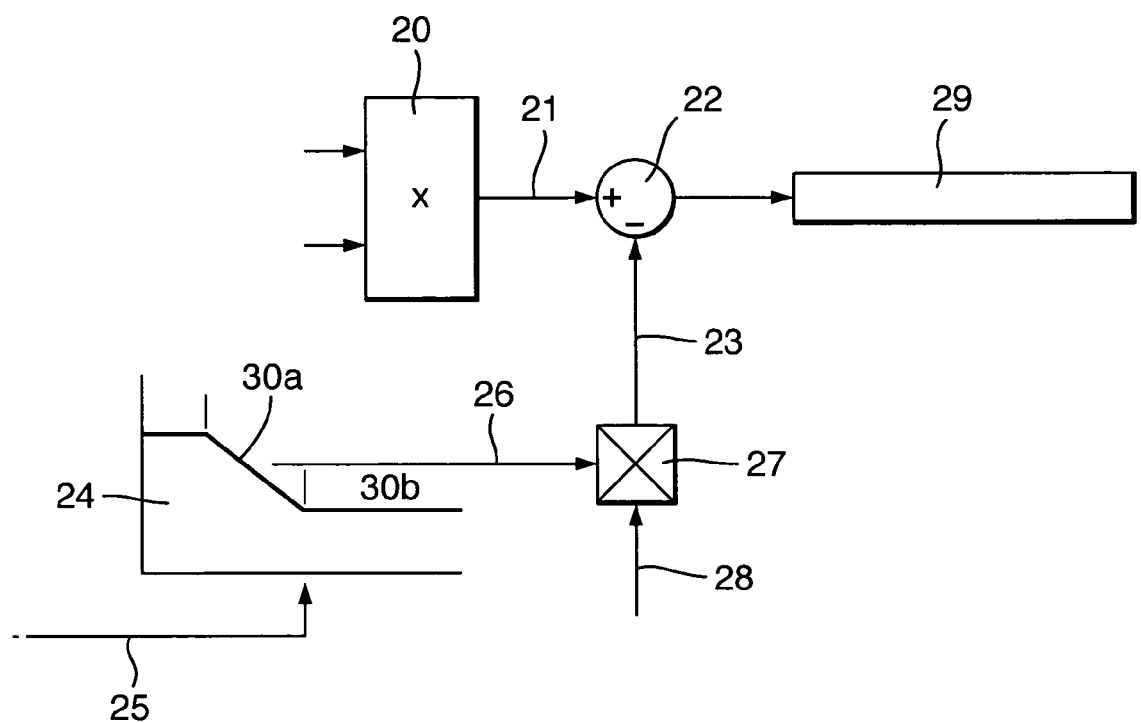
FIG. 2 is a schematic depiction of an engine control method and arrangement in accordance with the present invention.

FIG. 2 illustrates the operative parts of an engine control arrangement. Thus, a number of control signals are received by a control processor 20 in order to provide a calculated fuel flow rate value 21 presented to a fuel flow regulator 22. The fuel flow regulator 22 is generally controlled by the processor 20 and also receives in the embodiment depicted in FIG. 2 a heat soak adjustment signal 23 (HSA above). This heat soak adjustment signal (23) generally is provided as indicated as a signal taken from a look up table or curve 24 dependent upon a temperature sensor directly or indirectly measuring parameters within the engine. The value from the relationship or look up table 24 is presented as a signal 26 and this signal 26 may be simply presented as a heat soak adjustment signal 23, as described above or in a further part of the control processor 27 by an averaging or polling procedure provided as adjustment signal dependent on adjustments 28 from previous adjustment values 26 or otherwise in order to create the actual heat soak adjustment signal 23 presented to the fuel flow regulator 22. In either event, the regulator 22 through its controller acts to reconcile the calculated normal fuel flow rate 21 and the adjustment for heat soak signal 23 in order to create an operational fuel flow signal. As can be seen by the curve 30 in the relationship/table 24, the adjustment creates a value which is variable only in the slope 30(a) so that the effect upon the normal calculated fuel flow rate 21 is only operative when the signal 25 is in that range 30(a) or 30(b). In such circumstances, normal engine control operation is not compromised by the additional engine control features of the present method and arrangement.

As indicated above, the signal 25 upon which the heat soak adjustment signal 23 is dependent can be direct or indirect and as indicated can be specific to this particular required engine control method and apparatus or utilise a parameter produced or calculated for some other aspect of engine control methodology.

Figure 3:
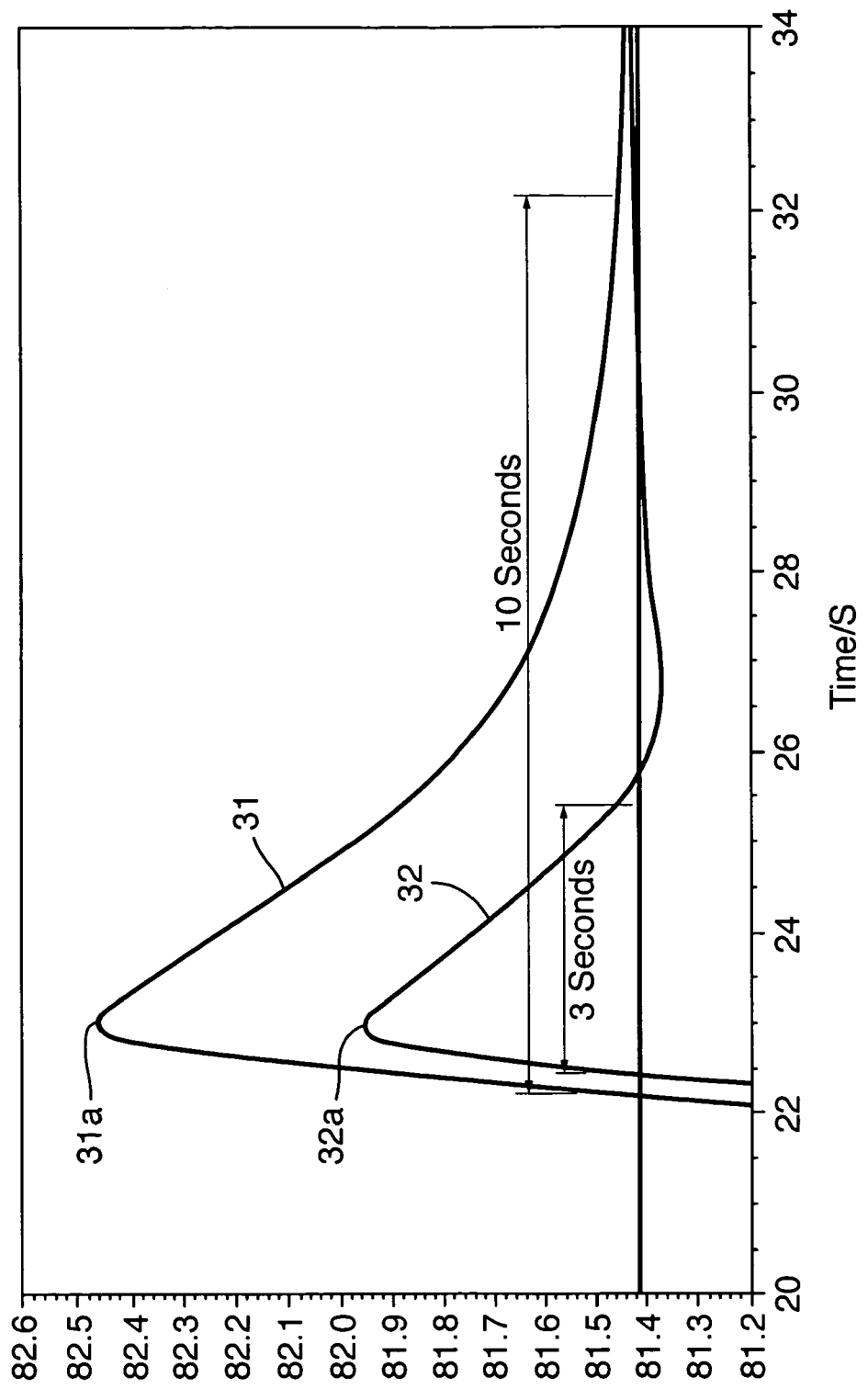
FIG. 3 is a graphic depiction comparing normal fuel flow with fuel flow adjusted in accordance with the present invention.

FIG. 3 provides a graphic illustration comparing a nominal thrust performance 31 using a prior unadjusted fuel flow rate control regime with thrust performance 32 utilising an engine control methodology and arrangement in accordance with the present invention. Thus, as can be seen, a much steeper and extensive deviation in the actual thrust parameter peak 31(a) is present in the previous fuel flow control regime compared to the peak 32(a) with the present engine control method and arrangement. Furthermore, and generally more importantly, the time period comparative between the overshoot created by the peaks 31(a), 32(b) with the respective previous and present engine control arrangements is such that in the example depicted the time period to stability is generally 10 seconds for the prior arrangement and only 3 seconds for the present arrangement. This again reduces the temporary over rotation value displayed and other undesirable factors with respect to the actual thrust parameter result.

Although generally described above with regard to the acceleration from idle to take off speeds for a gas turbine engine in an aircraft propulsion engine it will be appreciated that the engine control arrangement and method can be utilised in other situations. Thus, as indicated above a number of engine control strategies may be utilised within an engine in order to utilise the best strategy for a particular operational requirement, that is to say balancing the potential conflicting engine control operational requirements for normal steady static operation compared to take off requirements. In such circumstances, there may be still heat soakage effects due to thermal inertia either for cooling or heating of the engine components and therefore the present engine control regime in terms of its method and arrangement can be utilised to adjust the fuel flow values presented to the fuel regulator in these different engine control scenarios.

We claim:

1. An engine control method for a gas turbine engine, the method comprising:
   operating a gas turbine engine at a first thrust setting demanding a first normal fuel flow and having a first engine operating temperature;
   increasing the thrust to a second thrust setting and operating the gas turbine engine at a steady state, the second thrust setting demanding a second normal fuel flow and having a second engine operating temperature, the second engine operating temperature being greater than the first engine operating temperature;
   obtaining at least one engine temperature dependent variable of the engine and using the engine temperature dependent variable to determine a heat soak fuel flow to account for a thermal inertia of raising an operating temperature of the engine from the first operating temperature to the second operating temperature; and
   adjusting said second normal fuel flow by subtracting the heat soak fuel flow from said second normal fuel flow to reduce a size and duration of overshoot of power or thrust of the engine while operating the engine at the steady state.

2. A method as claimed in claim 1 wherein the engine temperature dependent variable is obtained by directly monitoring the temperature of an engine component using a sensor.

3. A method as claimed in claim 1 wherein the engine temperature dependent variable is indirectly obtained by measuring a temperature of a gas flow through the engine and extrapolating a temperature of the engine from the temperature of the gas flow.

4. A method as claimed in claim 3, wherein the temperature of the gas flow is obtained using a sensor disposed at an entrance to a combustion chamber for the engine.

5. An engine control method for a gas turbine engine, the method comprising:
   operating a gas turbine engine at a first thrust setting demanding a first normal fuel flow and having a first engine operating temperature;
   changing the thrust to a second thrust setting and operating the gas turbine engine at a steady state, the second thrust setting demanding a second normal fuel flow and having a second engine operating temperature;
   obtaining an engine temperature dependent variable of the engine and using the engine temperature dependent variable to determine a heat soak fuel flow to account for a thermal inertia of changing an operating temperature of the engine from the first operating temperature to the second operating temperature; and
   adjusting the second normal fuel flow by subtracting or adding the heat soak fuel flow to said second normal fuel flow.

6. An engine control method according to claim 5, wherein the second thrust setting and second operating temperature are lower than the first thrust setting and first operating temperature so that the second normal fuel flow is adjusted by adding the heat soak fuel to the second normal fuel flow.

7. An engine control method according to claim 5, wherein the engine temperature dependent variable is obtained by directly monitoring the temperature of an engine component using a sensor.

8. An engine control method according to claim 5, wherein the engine temperature dependent variable is indirectly obtained by measuring a temperature of a gas flow through the engine and extrapolating a temperature of the engine from the temperature of the gas flow.

9. An engine control method according to claim 8, wherein the temperature of the gas flow is obtained using a sensor disposed at an entrance to a combustion chamber for the engine.

* * * * *